Dec. 19, 1961     T. E. SPENCE     3,013,327
FABRICATION OF ANTI-FRICTION BEARING UNITS
Original Filed July 17, 1957

INVENTOR.
Thomas E. Spence,
BY Paul & Paul
ATTORNEYS.

United States Patent Office 3,013,327
Patented Dec. 19, 1961

3,013,327
FABRICATION OF ANTI-FRICTION BEARING UNITS
Thomas E. Spence, Wayne, Pa., assignor, by direct and mesne assignments, to SKF Industries, Inc., Philadelphia, Pa., a corporation of Delaware
Continuation of abandoned application Ser. No. 672,339, July 17, 1957. This application Sept. 23, 1960, Ser. No. 59,146
4 Claims. (Cl. 29—148.4)

This application is a continuation of my pending application Serial No. 672,339, filed July 17, 1957, entitled "Fabrication of Anti-Friction Bearing Units," which has been abandoned.

This invention relates to methods of fabricating anti-friction bearing units. More particularly, it is concerned with the production of anti-friction bearing units of the type wherein a full complement of rolling elements such as balls is interposed between an internally grooved outer race component and an externally grooved inner race component.

Heretofore, various methods have been resorted to in the fabrication of bearing units of the kind referred to, all of which methods were more or less involved and added very considerably to production costs.

In one of these prior art methods, the outer race component of the unit was formed by two complemental halves which met in the medial plane of the bearing and jointly provided an internal groove for the rolling elements, while the inner race component was integrally formed with an external peripheral race groove for the rolling elements. Assembling was accomplished by placing the inner race component into the hollow of one of the half sections of the outer race component, depositing a full complement of rolling elements into the exposed annular space, then applying the other half section of the outer race component over the balls, and finally applying a band about the assemblage and flanging the band peripherally over the two sections of the outer race component to permanently unite them.

In another method heretofore extensively practiced, the outer and inner race components were both integrally formed and provided respectively wtih complemental notches which jointly afforded a lateral opening to the raceways, through which opening the rolling elements were successively inserted.

In another prior art method, the outer race component was made integral, and the inner race component formed in two complemental half sections, assembling being affected by placing one of such half sections within the outer race component, then introducing the rolling elements into the annular space between the two components, then applying the other half section of the inner race component, then inserting either a solid or hollow rivet through the assemblage, and finally heading or flanging the ends of the rivet over the outer faces of the half sections of the inner race component.

In still another prior art procedure, the inner race component was integrally formed, and the outer race component was formed by two complemental semicircular half sections to meet in a diametral plane at right angles to the plane of the raceway. In assembling, the rolling elements were placed about the inner race component, the two half sections of the outer component then brought up to surround said rolling elements, and a band was placed thereabout to hold said sections together.

Obviously the fabrication of anti-friction bearing units by any of the above prior art methods was expensive by reason of the necessity for the multipartite construction of either the outer or inner race components or the notching of them, and also from the standpoint of labor costs in assembling the parts.

My invention has for its chief aim to overcome the aforementioned drawbacks of the prior art procedures in the production of anti-friction bearing units, through provision of a new method by which such units can be expeditiously fabricated more rapidly and at much less expense both from the standpoints of material and labor costs.

How this objective is realized in practice will appear from the following description of the attached drawings, wherein.

Figure 1:
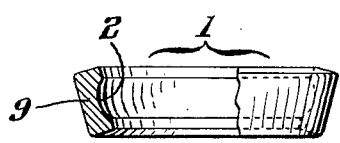
FIGS. 1–5 show sequential steps in the production of anti-friction bearing unit of the ball type in one way in accordance with my invention.
Figure 6:
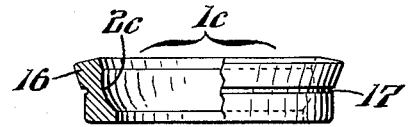
FIGS. 6–10 are views of an alternative embodiment of the invention.
Figure 2:
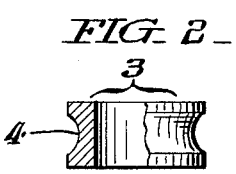
Figure 7:
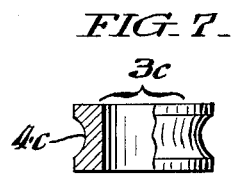
Figure 3:
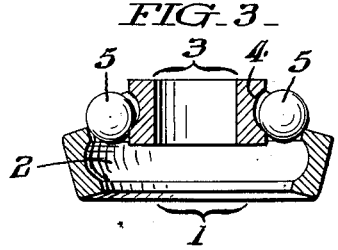
Figure 8:
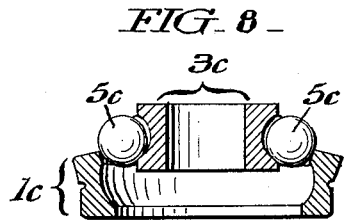
Figure 4:
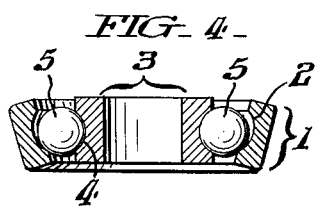
Figure 9:
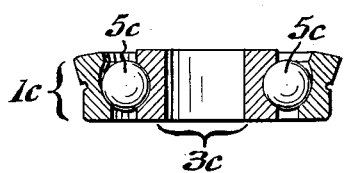
Figure 5:
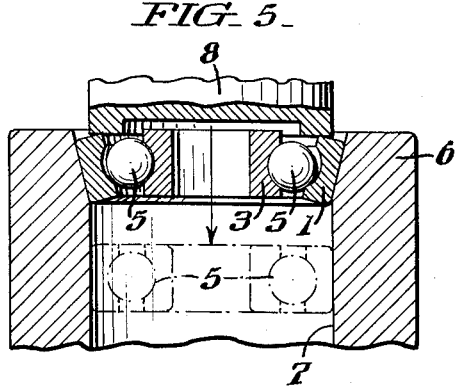

Referring first to FIG. 1 of these illustrations, the outer race component there shown and designated 1 is formed integrally, in accordance with my invention, as a coned annulus with an internal circumferential groove 2 having a cross-sectional contour which is rounded on a curvature somewhat larger than that of the balls. The inner race component illustrated in FIG. 2 and designated 3 is fabricated in this instance as ordinarily either as a solid cylindrical disk, or in the form of a cylindrical annulus as exemplified, and is provided with an external circumferential groove 4 which is cross-sectionally rounded on a curvature substantially equal to that of the balls. To assemble the unit, the component 3 is introduced partway into the hollow of the component 1 as in FIG. 3, and the balls 5 are then incidentally inserted into the annular space between the two components from the large diameter end of the outer component 1. The inner component 3 and the balls are thereupon released to drop until they rest on the bottom groove ledge of the outer component 1 as shown in FIG. 4. The assemblage is next inserted, as shown in FIG. 5, into the flared mouth end of a die block 6 which has a bore 7 corresponding in diameter to that of the small end portion of the outer race component 1 of the bearing.

As the assemblage is forced down through the bore 7 of the die 6 by the plunger 8, cold forging takes place in which the large diameter end of the outer race component 1 is contracted to the diameter of the small end and said component gradually converted to cylindrical form. During this transition, the metal of the outer component 1 is caused to roll upwardly about and to close in upon the balls 5, its cross-section being incidentally changed somewhat by enforced flow of the metal and the cross-sectional curvature of its groove made to conform accurately to the curvature of the balls without binding upon them, and the inner raceway 3 gradually receding downward all the while until it finally assumes a coplanar relationship with the balls in the finished bearing as shown in broken lines in FIG. 5. By the above procedure it will be seen that I have made possible rapid and economic production of ball bearings in quantity of which both the inner and outer raceway components are deep grooved for capacity to positively retain the balls with assurance against undue axial play as between said components.

Figure 10:
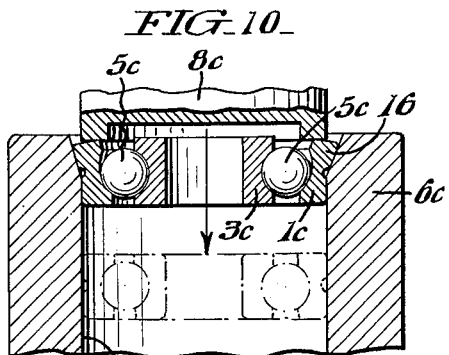

With reference now to the alternative embodiment of the invention shown in FIGS. 6–10, the outer race component 1c (FIG. 6) is conically flared outwardly as at 16 from the medial plane thereof, the lower half thereof being cylindrical. The cross-sectional contour of the lower half of the raceway 2c of the component 1c is rounded on a curvature substantially equal to that of the balls, while the cross-sectional contour of the raceway in the flared upper half of said component is rounded on a curvature somewhat larger than that of the balls. The inner race component 3c (FIG. 7) is identical with that of FIG. 2, i.e., it is cylindrical in form and has a peripheral groove 4c of which the cross-sectional curvature corresponds substantially to that of the balls. The manner of assembling the parts (FIGS. 8 and 9) is identical with that described in connection with FIGS. 3 and 4. The assemblage is placed, as shown in FIG. 10, into the flared mouth of the bore 7c of a die block 6c (identical with the die block of FIG. 5) and forced down into said block with incidental conversion of the component 1c to cylindrical configuration to close in upon the balls 5c as indicated in broken lines in FIG. 10. To facilitate inward displacement of the metal of the flared portion 16 of the outer race component 1c in this case, said component is provided with a shallow narrow peripheral medially located groove as at 17.

In both instances, it is to be understood that the component subjected to die action is fashioned from metal of a hardness which will withstand the swaging without fracture.

While in accordance with the provisions of the statutes, I have illustrated and described the best forms of embodiments of my invention now known to me it will be apparent to those skilled in the art that changes may be made in the form of the apparatus described without departing from the spirit and scope of the invention, as set forth in the appended claims, and that in some cases certain features of my invention may be used to advantage without a corresponding use of other features.

Having thus described my invention, I claim:

1. A method of fabricating a ball bearing, comprising, the steps of forming a cylindrical inner raceway component having an external circumferential groove concaved on a curvature substantially equal to that of the balls; forming a coned annular outer raceway component having an internal groove concaved on a curvature substantially larger than that of the balls, the opening at the large end of the outer raceway component being of a size to permit insertion through it of the inner component together with a full complement of the balls until the balls come to rest upon the bottom ledge of the internal groove at the small diameter end of said outer component and the inner component loosely rests on the balls; and finally compressing the large external diameter of the outer component to the external diameter of its small end to close in upon the balls, with incidental re-shaping of its cross-section and changing of the cross-sectional curvature of its groove to conform to that of the balls.

2. The invention according to claim 1, wherein the cross-section of the outer race component is reduced somewhat medially between the top and bottom faces of said component to facilitate the final step of the method.

3. The invention according to claim 1, wherein the outer race component is initially formed medially of its top and bottom faces with an external circumferential groove to facilitate the final step of the method.

4. The invention according to claim 2, wherein the outer race component is initially formed medially of its top and bottom faces with an external circumferential groove to facilitate the final step of the method.

References Cited in the file of this patent

UNITED STATES PATENTS

| | | |
|---|---|---|
| 881,471 | Hoffman | Mar. 10, 1908 |
| 1,048,758 | Sultemeyer | Dec. 31, 1912 |
| 1,080,169 | Reed | Dec. 2, 1913 |
| 1,419,521 | Rockwell | June 13, 1922 |

FOREIGN PATENTS

| | | |
|---|---|---|
| 617,991 | Great Britain | Feb. 15, 1949 |
| 924,924 | Germany | Mar. 10, 1955 |